US006777479B1

(12) United States Patent
Bernard et al.

(10) Patent No.: US 6,777,479 B1
(45) Date of Patent: Aug. 17, 2004

(54) POLYAMIDE NANOCOMPOSITES WITH OXYGEN SCAVENGING CAPABILITY

(75) Inventors: Linda Gail Bernard, Kingsport, TN (US); Horst Clauberg, Kingsport, TN (US); Michael John Cyr, Kingsport, TN (US); John Walker Gilmer, Kingsport, TN (US); Jeffrey Todd Owens, Kingsport, TN (US); Mark Edward Stewart, Kingsport, TN (US); Sam Richard Turner, Kingsport, TN (US); Shriram Bagrodia, Kingsport, TN (US); James Christopher Matayabas, Jr., Chandler, AZ (US)

(73) Assignee: Eastman Chemical Company, Kingsport, TN (US)

( * ) Notice: Subject to any disclaimer, the term of this patent is extended or adjusted under 35 U.S.C. 154(b) by 86 days.

(21) Appl. No.: 09/630,517

(22) Filed: Aug. 2, 2000

Related U.S. Application Data

(60) Provisional application No. 60/148,138, filed on Aug. 10, 1999, and provisional application No. 60/165,064, filed on Nov. 12, 1999.

(51) Int. Cl.[7] ................................................ C08K 3/34
(52) U.S. Cl. ...................... 524/445; 524/186; 524/398; 524/413; 524/435; 524/431
(58) Field of Search .......................... 523/210; 525/211; 524/186, 398, 413, 431, 435, 445; 501/145, 146, 148

(56) References Cited

U.S. PATENT DOCUMENTS

| 2,531,427 A | 11/1950 | Hauser |
| 2,737,517 A | 3/1956 | Boyd |

(List continued on next page.)

FOREIGN PATENT DOCUMENTS

| DE | 3806548 | 9/1988 |
| DE | 3808623 | 10/1988 |
| EP | 186456 | 7/1986 |
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 0846723 | 6/1998 |
| EP | 0 899 301 A1 | 3/1999 |
| EP | 0 909 787 A1 | 4/1999 |
| EP | 0909787 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 76029697 | 3/1976 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |

(List continued on next page.)

OTHER PUBLICATIONS

LeBaron et al., "Polymer–layered silicate nanocomposites: an overview," *App. Clay Sci.*, 15, 11–29 (1999).

(List continued on next page.)

*Primary Examiner*—Katarzyna Wyrozebski
(74) *Attorney, Agent, or Firm*—Dennis V. Carmen; Bernard J. Graves, Jr.

(57) ABSTRACT

Polymer composite materials comprising of least one polymer resin and platelet particles from at least one layered silicate material uniformly dispersed in the resin and articles prepared from the polymer composite materials. The polymer composite contains at least one polyamide resin, at least one oxygen scavenging system, and at least one layered silicate material. These polymer composite materials are especially useful for manufacturing clear polyester bottles and polyester film that are recyclable have improved active gas barrier properties to oxygen, and have improved passive barrier properties to carbon dioxide and other gases. The polymer composite materials can be used in relatively minor amounts as either a blend or a coextruded thin layer with virgin or post consumer recycled polyesters and related copolymners.

17 Claims, 2 Drawing Sheets

U.S. PATENT DOCUMENTS

| | | |
|---|---|---|
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel et al. |
| 3,876,552 A | 4/1975 | Moynihan |
| 3,879,283 A | 4/1975 | Mercade |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudiara et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson, Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A * | 9/1993 | Deguchi et al. ............ 524/444 |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A * | 1/1995 | Maxfield et al. ............ 428/297 |
| 5,414,042 A | 5/1995 | Yasue et al. |
| 5,429,999 A | 7/1995 | Naé et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A | 9/1996 | Beall et al. |
| 5,578,672 A | 11/1996 | Beall et al. |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,849,830 A | 12/1998 | Tipursky et al. |
| 5,882,751 A | 3/1999 | Occhiello et al. |
| 5,942,320 A | 8/1999 | Miyake et al. |
| 5,952,093 A | 9/1999 | Nichols et al. |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,162,857 A | 12/2000 | Trexler et al. |
| 6,232,388 B1 | 5/2001 | Lan et al. |
| 6,254,803 B1 * | 7/2001 | Matthews et al. ..... 252/188.28 |
| 6,391,449 B1 * | 5/2002 | Lan et al. ................... 428/402 |
| 6,410,156 B1 * | 6/2002 | Akkapeddi et al. ....... 428/476.1 |
| 6,423,776 B1 * | 7/2002 | Akkapeddi et al. ............ 525/66 |

FOREIGN PATENT DOCUMENTS

| | | |
|---|---|---|
| WO | WO 97/44384 | 11/1997 |
| WO | WO 98/01346 | 1/1998 |
| WO | 0822163 | 2/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/38914 A2 * | 8/1999 |
| WO | WO 99/41299 | 8/1999 |

| WO | WO 0034378 | 6/2000 |
| WO | WO 0034393 | 6/2000 |

OTHER PUBLICATIONS

Ke et al., "Crystallization, Properties, and Crystal and Nanoscale Morphology of PET–Clay Nanocomposites," *J. Appl. Polym. Sci.*, 71, 1139–1146 (1999).

Kawasumi et al., "Preparation and Mechanical Properties of Polypropylene–Clay Hybrids," *Macromolecules*, 30, 6333–6338 (1997).

Usuki et al., "Synthesis of Propylene–Clay Hybrid", *J. Appl. Polym. Sci.*, 63, 137–139 (1997).

Giannelis, "Polymer Layered Silicate Nanocomposites," *Advanced Materials*, 8, 29–35 (1996).

Kurowaka et al., "Preparation of a nanocomposite of polypropylene and smectite," *J. Materials Science Letters*, 15, 1481–1483 (1996).

Oriakhi et al., "Incorporation of poly(acrylic acid), poly(vinylsulfonate) and poly(styrenesulfonate) within layered double hydroxides," *J. Mater. Chem.*, 6, 103–107 (1996).

Messersmith et al., "Syntheses and Barrier Properties of Poly($\epsilon$–Caprolactone)–Layered Silicate Nanocomposites," *J. of Polym. Sci.*, 33, 1047–1057 (1995).

Pinnavaia et al., "Clay–Reinforced Epoxy Nanocomposites," *Chem. Mater.*, 6, 2216–2219 (1994).

Sugahara et al., "Clay–Organic Nano–Composite; Preparation of a Kaolinite—Poly(vinylpyrrolidone) intercalation Compound," *J. Ceramic Society of Japan*, 100, 413–416 (1992).

Yano et al., "Synthesis and properties of polyimide–clay hybrid," *ACS, Polymer Preprints*, 32, 65–66, (1991).

Fukushima et al., "Swelling Behavior of Montmorillonite by Poly–6–Amide," *Clay Minerals*, 23, 27–34 (1988).

Verbicky, *Encyclopedia of Polymer Science and Engineering*, 2nd Edition, 12, 364–383 (1988).

Fukushima et al., "Synthesis of an Intercalated Compound of Montmorillonite and 6–Polyamide," *J. Inclusion Phenomena*, 5, 473–482, (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

Greenland, "Adsorption of Polyvinyl Alcohols by Montmorillonite," *J. Colloid Sci.*, 18, 647–664 (1963).

\* cited by examiner

Fig. 1

Fig. 2

POLYAMIDE NANOCOMPOSITES WITH OXYGEN SCAVENGING CAPABILITY

CROSS REFERENCE TO RELATED APPLICATIONS

This application claims the benefit of U.S. Provisional Application Serial No. 60/165,064 filed Nov. 12, 1999 and 60/148,138, filed Aug. 10, 1999.

BACKGROUND OF INVENTION

MXD6 is a commercially available partially-aromatic nylon prepared from adipic acid and meta-xylene diamine, and is also available as a copolyamide with comonomers including isophthalic acid. MXD6 and copolyamides are preferred barrier materials for use in multilayer PET bottles due to their similar processing conditions and rheology to PET and due to their improved resistance to delamination from PET compared to EVOH. However, their use is limited because bottles comprising MXD6 as a blend or as one or more discrete layers with, for example, PET have insufficient barrier for packaging highly oxygen sensitive food and/or are not recyclable in processes established for monolayer PET bottles due to the large amount of MXD6 that is required.

Platelet particles have been incorporated to improve the passive oxygen barrier of MXD6; however, relatively large amounts of the MXD6-platelet particle composite are still needed to achieve the desired oxygen barrier and, therefore, the bottles are still difficult, if not impossible to recycle.

Certain transition metal catalysts have been added to MXD6 to impart oxygen scavenging capability (active barrier), which greatly reduces the amount of MXD6 needed. However, most food and beverage products require high gas barrier properties to more than just oxygen. For example, beer bottles require high oxygen barrier to protect the beer and require high carbon dioxide barrier to contain the desired carbon dioxide within the package. Active scavenger approaches often fall short of meeting the barrier requirements other than or require the use of such a large amount of oxygen scavenging MXD6 that the bottles are difficult or impossible to recycle.

PRIOR ART

U.S. Pat. No. 4,739,007 discloses composite materials comprising a polyamide matrix and a dispersed layered silicate material that is incorporated during polymerization and imparts high mechanical strength and excellent high temperature properties.

U.S. Pat. No. 4,810,734 discloses nylon composites comprising a layered silicate material that has been treated with certain organic ammonium compounds and incorporated by synthesis using a dispersing aid.

PCT application WO 93/04117 discloses composite materials comprising a polyamide matrix and a layered silicate material that has been modified with certain primary or secondary organic ammonium compounds incorporated during melt extrusion to impart improved modulus to the polymer composite.

PCT application WO 93/11190 discloses nylon composites comprising a layered silicate material that has been treated first with certain organic ammonium compounds then with certain silane compounds and incorporated by melt blending.

US 97124103 discloses polymer composites comprising a layered silicate material that has been treated first with certain organic ammonium compounds then with an expanding agent and incorporated by synthesis or by melt blending.

U.S. Pat. Nos. 5,021,515 and 5,034,252 disclose high barrier containers comprising mixtures of PET and nylon comprising a transition metal oxygen scavenging catalyst.

U.S. Pat. No. 5,077,111 discloses recyclable multilayer preforms and bottles comprising a total of 1–8 wt % of MXD6 comprising a cobalt salt that catalyzes oxygen scavenging. This patent suggests that when the total content of MXD6 is less than or equal to the preferred amount of 4 wt % that the bottles are recyclable. In practice, however, it has been found that bottles comprising less than about 4 wt % of MXD6 have insufficient barrier to carbon dioxide to meet the preferred barrier requirements for packaging products that require high gas barrier to oxygen plus one or more other gasses, such as beer. Beer brewing companies have published their preferred gas barrier requirements—see for example Norm Nieder "Is Plastic Ready for Beer," Proceeding of the $3^{rd}$ International Conference on Rigid Polyester Packaging Innovations for Food and Beverages, NovaPak Americas '98. Those requirements include less than 10% loss of carbon dioxide from 2.8–3.0 volumes for about 105–120 days. Bottles prepared as described in the above US patents must comprise more than about 4.5 wt % MXD6 to meet this requirement. Because such large amounts of MXD6 are required, true recyclability is problematical and/or the preferred gas barrier properties are not achieved, which restricts the applications to short term use, such as promotional and stadium events.

DESCRIPTION OF THE INVENTION

This invention relates to polymer-platelet particle composites composed of at least one polymer resin and platelet particles uniformly dispersed therein and products produced from said composite. More specifically, this invention relates to a polymer-platelet particle composite comprised of at least one polyamide resin, at least one oxygen scavenging catalyst, and at least one layered silicate material. Typically, the layered silicate material is treated to enhance dispersibility into the composite. The present invention further relates to a process for forming polymer-platelet particle composites comprising mixing the oxygen scavenging catalyst with the layered silicate material and organic cation to bind the organic cation and oxygen scavenging catalyst to said layered silicate material to form an organoclay and incorporating the organoclay into a polymer. The polymer-platelet particle composites produced according to the present invention are especially useful for preparing clear bottles and film that are recyclable, exhibit improved active gas barrier properties to oxygen, and exhibit improved passive barrier to other gasses. By virtue of their high gas barrier properties, polymer-platelet particle composites produced according to the present invention can be used in relatively minor amounts as either a blend or a very thin layer with PET and related copolymers, either virgin or post consumer recycled, and this low concentration of polymer-platelet particle composite provides the unique combination of good oxygen gas barrier protection, good carbon dioxide barrier retention, and recyclability.

Platelet Particles

The polymer-platelet particle composites of the present invention comprise up to about 30 weight percent, preferably less than about 20 weight percent, of certain platelet particles derived from at least one layered silicate material which has been modified with at least one ammonium compound. The amount of platelet particles is determined by measuring the residual ash of the polymer-platelet particle compositions when treated in accordance with ASTM D5630-94, which is incorporated herein by reference. The gas barrier improvement increases with increasing concentration of platelet particles in the composite. While amounts of platelet particles as low as about 0.01 percent provide improved barrier (especially when well dispersed and ordered), compositions having at least about 0.5 weight percent of the platelet particles are preferred because they display desirable improvements in gas permeability.

Preferred layered silicate materials employed in the invention include any solid material having at least some inorganic anionic atoms, ions, or chemical groups arranged in generally planar layers in the solid state, wherein the spacing between at least some of the generally planar layers are capable of being increased, swelled, or separated by the insertion of inorganic or organic materials there between. Generally layered silicate materials are a dense agglomeration of platelet particles which are closely stacked together like cards. The platelet particles of the present invention have a thickness of less than about 2 nm and a diameter in the range of about 10 to about 5000 nm. For the purposes of this invention, such measurements refer only to the platelet particle and not to the ammonium compounds or any additional dispersing aids and treatment compounds which might be used. Suitable layered silicate material are free flowing powders having a cation exchange capacity between about 0.3 and about 3 meq/g and preferably between about 0.8 and about 1.5 meqg and more preferably from about 0.95 to about 1.25 meq/g.

Many layered silicate materials are silicates. As used herein, "silicate" shall mean any composition having silicon atoms bound to one or more oxygen atoms to form anionic groups, in combination with one or more additional cations, wherein the cations may be inorganic, metallic, or organic cations.

Examples of suitable layered silicate materials include natural, synthetic and modified phyllosilicates. Illustrative of such natural clays are smectite clays, such as montmorillonite, hectorite, mica, vermiculite, bentonite, nontronite, beidelite, volkonskoite, saponite, sauconite, magadite, kenyaite and the like. Illustrative of such synthetic clays are synthetic mica, synthetic saponite, synthetic hectorite, and the like. Illustrative of such modified clays are flourinated montmorillonite, flourinated mica, and the like. Suitable layered silicate materials are available from various companies including Southern Clay Products, Gonzalez, Tex.; Nanocor, inc, Arlington Heights, Ill.; Kunimine Industries, Ltd., Chiyodaku, Tokyo, Japan and Rheox of Hightown, N.Y. The most preferred platelet particles are derived from sodium bentonite or sodium montmorillonite. One of ordinary skill in the art will readily recognize that Wyoming type montrnorillonite and/or Wyoming-type bentonite are naturally occurring layered silicate materials comprising large proportions of sodium bentonite or sodium montrnorillonite. Thus it may be stated that highly preferred platelet particles for use in the present invention are residues derived from further treatment of any of sodium bentonite, sodium montmorillonite, "Wyoming type" bentonite or "Wyoming type" montmorillonite. It is to be understood that at least some of the sodium cations of a natural or synthetic sodium bentonite or sodium bentonite, a naturally occurring "Wyoming type" bentonite or "Wyoming, type" montmorillonite are removed and/or exchanged when treated with salts of the alkoxylated onium cations of the invention. Nevertheless, for the purposes of this invention and disclosure, the residues of the treated clays may be referred to, and are defined as a "Wyoming type bentonite", a "Wyoming type montmorillonite", a "sodium bentonite", or a "sodium montmorillonite". Residues of such clays need not contain detectable amounts of sodium after the clays have undergone treatment with the alkoxylated onium cation salts of the invention. However, some sodium cations may remain. Such clays are readily available in the U.S., known as Wyoming type montmorillonite, and other parts of the world, including the Kunipia clays available from Kunimine Industries, Inc.

Preferred layered silicate materials are phyllosilicates of the 2:1 type having a cation exchange capacity of 0.5 to 2.0 meq/g. The most preferred layered silicate materials are smectite clay minerals, particularly bentonite or montmorillonite, more particularly Wyoming-type sodium montmorillonite or Wyoming-type sodium bentonite having a cation exchange capacity from about 0.95 to about 1.25 meq/g. The most preferred layered silicate materials are derived from sodium bentonite or sodium montmorillonite:

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

The layered silicate materials are typically treated to improve dispersion into the composite. Many useful clay treatments are known in the art, and these treatments may also be used before, after, or during incorporation of the layered silicate materials into the composites of this invention without deviating from the scope of this invention Examples of useful treatments include, but are not limited to treatments with silane compounds, expanding agents, polymers and oligomers, dispersing aids, organic cation salts, and their combinations.

Examples of useful treatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Examples of useful treatment with expanding agents include those treatments disclosed in US 97/24103, incorporated herein by reference. Oligomeric polymers may also be used as suitable expanding agents.

Useful polymers and oligomers for treating clays include those disclosed in U.S. Pat. Nos. 5,552,469 and 5,578,672, incorporated herein by reference.

Many dispersing aids are known, covering a wide range of materials including water, alcohols, ketones, aldehydes, chlorinated solvents, hydrocarbon solvents, aromatic solvents, and the like or combinations thereof.

Useful organic cation salts for additional treatment can be represented as follows:

(I)

Wherein M represents nitrogen or phosphorous; X⁻ represents an anion, preferably a halide atom such as chloride or bromide; $R_1$, $R_2$, $R_3$ and $R^4$ are independently selected from organic and oligomeric ligands having 1 to 30 carbon atoms or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to a poly(alkylene oxide) group such as polyethylene glycol groups, and polybutylene glycol groups; polystyrene, polyacrylate, polycaprolactone, and the like.

Useful alkoxylated ammonium compounds for the process of this invention may also include mono-alkoxylated, di-alkoxylated, tri-alkoxylated, and tetra-alkoxylated ammonium compounds. Examples of useful alkoxy ligands include, but are not limited to, hydroxyethyl, hydroxypropyl, hydroxybutyl, poly(ethylene oxide), poly(propylene oxide), poly(butylene oxide), and the like.

Illustrative of suitable mono-alkoxylated amine compounds, which are converted to the ammonium salt by reaction with a Bronsted acid, include, but are not limited to, compounds represented as follows:

Wherein N represents nitrogen; $X^-$ represents an anion, which is preferably a halide atom such as chloride or bromide; $R_1$, $R_2$, and $R_3$ may be the same or different and are organic or oligomeric ligands comprising 1 to 30 carbon atoms, or may be hydrogen; n is at least 1; $R_4$ is hydrogen or a hydrocarbon comprising 1 to 4 carbon atoms; and $R_5$ is hydrogen or a hydrocarbon comprising 1 to 7 carbon atoms.

With respect to the alkoxylated onium compounds or cations, preferred alkoxyl groups comprise a group or residue exemplified above and below by the formula:

which may represent either an alkoxyl group or a hydroxyalkyl group. Examples of useful alkoxyl ligands include, but are not limited to groups or residues that comprise methoxymethyl, hydroxyethyl, methoxyethyl, hydroxypropyl, hydroxybutyl, poly(ethylene oxide), poly(propylene oxide), poly(butylene oxide), and the like. Preferred mono-alkoxylated ammonium cations are tertiary (ie. only one of $R_1$, $R_2$ or $R_3$ are hydrogen) or are quaternary (i.e. none of $R_1$, $R_2$ or $R_3$ are hydrogen) and are sold under the trade name of Jeffamine by Huntsman.

Examples of useful di-alkoxylated ammonium compounds include, the compositions represented as follows:

wherein N represents nitrogen; $X^-$ represents an anion which is preferably a halide atom such as chloride or bromide; $R_1$ and $R_2$ may be the same or different and are organic or oligomeric ligands comprising 1 to 30 carbon atoms, or may be hydrogen; p and n are at least 1 and can be the same or different; and $R_3$, $R_4$, $R_5$ and $R_6$ may be same or different and are hydrogen or hydrocarbons comprising 1 to 4 carbon atoms. Examples of useful di-alkoxylated ammonium cations include, but are not limited to bis(1-hydroxymethyl), octadecyl ammonium (having a hydrogen attached to nitrogen); bis(2-hydroxyethyl), octadecyl methyl ammonium; octadecyl isopropoxy dimethyl ammonium; and the like or a mixture thereof.

Illustrative examples of suitable di-ethoxylated ammonium salts include those available under the trade name Ethoquad or Ethomeen from Akzo Chemie America, namely, Ethoquad 18/25 which is octadecyl methylbis(polyoxyethylene[15]) ammonium chloride and Ethomeen 18/25 which is octadecyl bis(polyoxyethylene[15]) amine, wherein the numbers in brackets refer to the total number of ethylene oxide units.

Preferably, $R_1$ and $R_2$ are organic ligands. Preferred di-alkoxylated ammonium cations are tertiary (i.e. only one of $R_1$ or $R_2$ are hydrogen) or are quaternary (i.e. neither $R_1$ or $R_2$ are hydrogen). Preferred di-alkoxylated ammonium cations within this class have at least one hydroxyalkyl residue (i.e. at least one of $R_5$ or $R_6$ are hydrogen). Even more preferred di-alkoxylated ammonium cations within this class are tertiary or quaternary, and have two hydroxyalkyl ligands (i.e. $R_1$ and $R_2$ are not hydrogen, and $R_5$ and $R_6$ are hydrogen).

Useful tri-alkoxylated ammonium salts for the compositions, nanocomposites, and processes of this invention can be represented as follows:

wherein N represents nitrogen; $X^-$ represents an anion which is preferably a halide such as chloride or bromide; $R_1$ is an organic or oligomeric ligand comprising 1 to carbon atoms, or may be hydrogen; n, p, and q are at least 1 and can be the same or different; and $R_2$, $R_3$, $R_4$, $R_5$, $R_6$ and $R_7$ may be the same or different and are hydrocarbons comprising 1 to 4 carbon atoms or hydrogen. Preferably, $R_1$ and $R_2$ are not oligomeric. One of ordinary skill in the art will recognize that tri-alkoxylated ammonium salts are inherently at least tertiary, and will be quaternary if $R_1$ is not hydrogen.

Useful tetra-alkoxylated ammonium salts for the nanocomposite and process of this invention can be represented as follows:

wherein N represents nitrogen; $X^-$ represents an anion which is preferably a halide atom such as chloride or bromide; m, n, p, and q are at least 1 and can be the same or different; and $R_1$, $R_2$, $R_3$, $R_4$, $R_5$, $R_6$, $R_7$ and $R_8$ may be the same or different and are hydrocarbons comprising 1 to 4 carbon atoms or hydrogen.

Certain preferred alkoxylated ammonium salts for the compositions, nanocomposites and process of this invention is a di-ethoxylated ammonium salt represented as follows:

wherein N represents nitrogen; $X^-$ represents an anion which is preferably a halide atom such as chloride or bromide; $R_1$ is an organic or oligomeric ligand comprising at least 8 carbon atoms; $R_2$ is hydrogen or an organic and oligomeric ligand comprising at least 8 carbon atoms; and p and n are at least 1 and can be the same or different. Preferably, $R_1$ and $R_2$ are not oligomeric. Preferably, only one of $R_1$ and $R_2$ is hydrogen (i.e. the cation is tertiary), or neither $R_1$ or $R_2$ is hydrogen (i.e. the cation is quaternary).

Even more preferably, N represents nitrogen; $R_1$ is an organic ligand comprising from 1 to 30 carbon atoms; $R_2$ is hydrogen or an organic ligand from 1 to 4 carbon atoms; and p and n are at least 1 and can be the same or different. Particularly preferably, $R_2$ is an organic ligand (i.e. the cation is quaternary).

Illustrative examples of suitable di-ethoxylated ammonium salts include those available under the trade name ETHOQUAD or ETHOMEEN from Akzo Chemie America, Chicago Ill., namely, ETHOQUAD 18/25, which is octadecyl methyl bis(polyoxyethylene[15]) ammonium chloride and ETHOMEEN 18/25, which is octadecyl bis (polyoxyethylene[15])amine, wherein the numbers in brackets refer to the total number of ethylene oxide units. The most preferred alkoxylated ammonium cations are octadecyl methyl bis(2-hydroxyethyl) ammonium and methyl bis(2-hydroxyethyl) tallow ammonium.

One of ordinary skill in the art will recognize that tallow is a mixture of materials derived from the treatment of animal fats, principally comprising a 50% majority mixture of chemical compounds having saturated and unsaturated $C_{18}$ alkyl groups also comprising smaller amounts of other alkyl groups, including $C_{16}$ alkyl groups. Tallow may be treated to remove any unsaturated groups, to generate hydrogenated tallow. It is to be understood that a reference to "tallow" includes "hydrogenated tallow" unless otherwise specifically indicated herein.

Numerous methods to modify layered silicate materials with ammonium compounds are known, and any of these methods may be used in the process of this invention One embodiment of this invention is the modification of at least one layered silicate material with at least one ammonium compound by the process of dispersing the layered silicate material(s) in hot water, most preferably from about 50 to about 80° C., adding (neat or dissolved in water or alcohol) an organic ammonium salt or an organic amine and a Bronsted acid (thereby forming the organic ammonium salt in situ) or their combinations and mixtures with agitation. Then the mixture is blended for a period of time sufficient for the organic ammonium cations to exchange most of the metal cations present in the galleries between the layers of the clay material. Then, the organically modified layered silicate material (organoclay) is isolated by methods known in the art including, but not limited to, filtration, centrifugation, spray drying, and their combinations. It is desirable to use a sufficient amount of the organic ammonium salt to permit exchange of most of the metal cations in the galleries of the layered particle for organic cations; therefore, at least about 0.5 equivalent of organic cation salt is used and up to about 3 equivalents of organic cation salt can be used. It is preferred that about 0.5 to about 2 equivalents of organic cation salt be used, more preferable about 1.0 to about 1.5 equivalents. It is often desirable, but not required, to remove most of the metal cation salt and most of the excess organic cation salt by washing and by other techniques known in the art. The particle size of the organoclay is reduced in size by methods known in the art, including, but not limited to, grinding, pulverizing, hammer milling, jet milling, and their combinations. It is preferred that the average particle size be reduced to less than about 100 microns in diameter, more preferably less than about 50 microns in diameter, and most preferably less than about 20 microns in diameter.

It should be appreciated that on a total composition basis dispersing aids and/or pretreatment compounds which are used may account for significant amount of the total composition, in some cases up to about 30 weight percent. While it is preferred to use as little dispersing aids and/or pretreatment compounds as possible, the amounts of dispersing aids and/or pretreatment compounds may be as much as about 10 times the amount of the platelet particles.

Oxygen Scavenging Systems

According to a preferred embodiment of this invention, the polyamide comprises a sufficient amount of an oxygen scavenging system to impart the desired oxygen barrier and scavenging effect. Because the silicate particles provide improved passive barrier to gas, oxygen scavenging by the compositions in this invention are more efficient, thus the amount of oxygen scavenging system is less than would be required in the absence of the silicate material. This feature provides the advantages of lower cost, improved ease of preparation, and improved recyclability. The amount of oxygen scavenging system required depends on several factors, including the desired oxygen barrier, the thickness of the container or film, the amount and selection of polyamide, the amount and selection of silicate material, and the selection of oxygen scavenging system. Suitable oxygen scavenging systems comprise one or more oxidizable materials and often one or more catalysts to facilitate the oxidation reaction.

Numerous oxygen scavenging systems are known and can be incorporated into the composition of this invention. Possible oxygen scavenging systems that can be used as a component of the present invention are: ethylenically unsaturated hydrocarbons and a transition metal catalyst; ascorbate; isoascorbate; sulfite; ascorbate with a catalyst, which may be a metal, a salt, or a compound, chelate or complex of a transition metal; a transition metal complex or chelate of a polycarboxylic acid, polyamine or salicylic acid, a reduced form of a quinone, anthraquinone or other photoreducible dye, or a carbonyl compound with an absorbance in the ultraviolet spectrum ; tannin; polyethers with a transition metal catalyst; polyamides (such as, but not limited to those used to form the nanocomposite) with a transition metal catalyst; organic compounds having a tertiary hydrogen, benzylic hydrogen or allylic hydrogen in combination with a transition metal catalyst; an oxidizable metal usually in combination with a salt; or a metal in a low oxidation state that can be oxidized farther to higher oxidation state, usually in combination with a salt.

Ethylenically unsaturated hydrocarbons may be any aliphatic hydrocarbon having at least one carbon-carbon double bond. These unsaturated hydrocarbons may be monomeric or polymeric compounds. Specific examples of polymeric ethylenically unsaturated compounds are polybutadienes, polystyrene-polybutadiene copolymers, polymers containing cyclohexene units, as well as polyesters, polyamides, co-polyesters and co-polyamides containing monomers having aliphatic carbon-carbon double bonds. Useful polyethers are, but are not limited to, polyethylene oxide, polypropylene oxide, polytetramethylene glycol and poly butylene oxide (poly-tetrahydrofuran). Oxidizable metals include, but are not limited to, Fe, Co, Cu, Ni, V, Mn, Al, Zn, Si, Sn, Ti, Mg, Na. Iron(II) compounds are an example of metal compounds with a metal in a low oxidation state that can be oxidized further.

When a catalyst is used with the polyamide of the nanocomposite, a wide range of oxygen scavenging catalysts have been found to be operative, and any of these may be used in the practice of this embodiment of the present invention. Suitable oxidation catalysts include transition metal catalysts which can readily interconvert between at least two oxidation states. Preferably, the transition metal is in the form of a transition metal salt with the metal selected from the first, second or third transition series of the Periodic Table. Suitable metals include, but are not limited to Fe, Co, Cu, Ni, V, Mn, Al, Zn, Si, Sn, Ti, Mg, Na, and more specifically include manganese II or III, iron II or III, cobalt II or III, nickel II or III, copper I or II, rhodium II, III or IV and ruthenium. In some embodiments the most preferred transition metal is cobalt.

Suitable counterions for the metal include, but are not limited to, chloride, acetate, acetylacetonate, stearate, palmitate, 2-ethylhexanoate, neodecanoate or naphthenate. The metal salt may also be an ionomer, in which case a polymeric counterion is employed. Such ionomers are well known in the art. Any amount of catalyst which is effective in catalyzing oxygen scavenging may be used. Ranges for the oxygen scavenging catalyst include from at least about 1 ppm, preferably about 10 to about 10,000 ppm, preferably from about 50 to 500 ppm, and are readily ascertained by those skilled in the art.

The oxygen scavenging catalyst may be incorporated in a number of different ways. For example, the catalyst may be incorporated into the polyamide either before or after incorporation of the organoclay by well known methods such as admixing either before or after the formation of the polyamide pellets. The oxygen scavenging catalyst may also be incorporated into the organoclay via ion exchange, for example. Binding the oxygen scavenging catalyst to the organoclay prevents migration of the oxygen scavenging catalyst from the container wall to its contents. Moreover, the catalyst counterion is washed away during the ion exchange process, removing another potentially undesirable migratory compound. Finally, incorporating the oxygen scavenging catalyst onto the organoclay can also provide processing benefits. It can be difficult to consistently add small amounts of a material into a polymer, such as polyamide, and to insure it has been uniformly dispersed throughout. It is also difficult to get the oxygen scavenging catalyst in a form which is soluble in the polymer melt. Crystals and particulates can be highly undesirable because they frequently impart haze and voids in the finished article.

However, when the oxygen scavenging catalyst is incorporated into the organoclay these problems are avoided. First, ion exchange allows the catalyst to be added in a soluble form. Second, far more catalyst can be added because the organoclay will be let down at the appropriate concentration into the polyamide. Finally, the concentration of the oxygen scavenging catalyst incorporated can be readily controlled by controlling the amount of clay sites available for exchange, via, for example, controlling the amount of organic cation added to the clay. Finally, because the counterion on the oxygen scavenging catalyst is washed away during the exchange process, and the oxygen scavenging catalyst is bound to the organoclay, potential migratory compounds are minimized.

An oxygen scavenging catalyst, as used in the specification and concluding claims, includes both the transition metal and counterion, and the transition metal moiety that is the resulting product a particular reaction scheme or subsequent formulation or chemical product. Thus, for example, oxygen scavenging catalyst includes both transition metals bound to counterions and the transition metal which is which are bound to other components, such as an organoclay.

Polyamides

Suitable polyamides include partially aromatic polyamides, aliphatic polyamides, wholly aromatic polyamides and mixtures and copolymers thereof. By "partially aromatic polyamide" it is meant that the amide linkage of the partially aromatic polyamide contains at least one aromatic ring and a nonaromatic species.

Suitable polyamides have a film forming molecular weight and preferably an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/1,1,2,2-tetrachloroethane at a concentration of 0.5 grams per 100 ml. Wholly aromatic polyamides comprise in the molecule chain at least 70 mole % of structural units derived from m-xylylene diamine or a xylylene diamine mixture comprising m-xylylene diamine and up to 30% of p-xylylene diamine and an αϵ-aliphatic dicarboxylic acid having 6 to 10 carbon atoms, which are further described in Japanese Patent Publications No. 1156/75, No. 5751175, No. 5735/75 and No. 10196/75 and Japanese Patent Application Laid-Open Specification No. 29697/75, the disclosure of which is incorporated herein by reference.

Polyamides formed from isophthalic acid, terephthalic acid, cyclohexanedicarboxylic acid, meta- orpara-xylylene diamine, 1,3- or 1,4-cyclohexanebis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include: poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamideco-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and mixtures thereof. The most preferred partially aromatic polyamide is poly(m-xylylene adipamide), which is available from Mitsubishi Gas and Chemical Company, Chiyodaku, Tokyo, Japan. Poly(m-xylylene adipamide) is a preferred polyamide due to its availability, high gas barrier properties, and processability in conjunction with PET.

Suitable aliphatic polyamides include polycapramide (nylon 6), poly-aminoheptanoic acid (nylon 7), poly-aminononanoic acid (nylon 9), polyundecane-amide (nylon 11), polylaurylactam (nylon 12), polyethylene-adipamide (nylon 2,6), polytetramethylene-adipamide (nylon 4,6), polytetramethylene-adipamide (nylon 6,6), polyhexamethylene-sebacamide (nylon 6,10), polyhexamethylene-dodecamide (nylon 6,12), polyoctamethylene-adipamide Hi (nylon 8,6), polydecamethylene-adipamide (nylon 10,6), polydecamethylene-adipamide (nylon 12,6) and polyhexamethylene-sebacamide (nylon 12,8).

Preferred aliphatic polyamides include poly(hexamethylene adipamide) and poly(caprolactam). The most preferred aliphatic polyamide is poly(hexamethylene adipamide). Partially aromatic polyamides, are preferred over the aliphatic polyamides where good thermal properties are crucial.

The most preferred polyamides include poly(m-xylylene adipamide), polycapramide (nylon 6), polyhexamethylene-adipamide (nylon 6,6).

The polyamides are generally prepared by processes which are well known in the art.

The polymers of the present invention may also include suitable additives normally used in polymers. Such additives may be employed in conventional amounts and may be added directly to the reaction forming the matrix polymer. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, plasticizers, nucleators, mold release agents, compatibilizers, processing aids and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

Processes

In one embodiment of this invention, a polyamide-platelet particle composite is prepared and then at least one oxygen scavenging catalyst is incorporated into the polymer-platelet particle composite. Many processes to prepare polyamide-platelet particle compositions are known, and any of these processes may be used to prepare the composites of this present invention. Although any melt mixing device may be used, typically, the melt mixing step is conducted either by a batch mixing process or by a melt compounding extrusion process during which treated or untreated layered particles are introduced into a polyamide. Use of extrusion compounding to mix the clay and the polymer is preferred because of the ease of preparation and the potential to attain high clay loadings. Prior to melt mixing, the treated or untreated layered particles may exist in various forms including pellets, flakes, chips and powder. It is preferred that the treated or untreated layered particles be reduced in size by methods known in the art, such as hammer milling and jet milling. Prior to melt mixing, the polyamide may exist in wide variety of forms including pellets, ground chips, powder and polyamide melt. In one method of preparing the polymer-platelet composites of this invention oligomeric polymers are used as the expanding agent. The clay is let down in the oligomeric material to form a concentrate, and then the concentrate is let down into the desired matrix polymer. Alternatively the oligomeric polymer and organoclay are incorporated into the polymer matrix at the same stage. Many processes to incorporate additives, such as catalysts, are known, and any of these processes may be used to prepare the composites of this present invention. In one embodiment, a concentrate of oxygen scavenging catalyst in a polyamide or copolymer or oligomer and this concentrate is mixed with the polyamide platelet particle composite.

In another embodiment, the melt mixing step is achieved by dry mixing polyamide, concentrate of platelet particles, and concentrate of oxygen scavenging catalyst then passing the mixture through a compounding extruder under conditions sufficient to melt the polyamide. In yet another embodiment of this invention, the melt mixing step is conducted by feeding the polyamide, concentrate of platelet particles, and concentrate of oxygen scavenging catalyst separately into a compounding extruder.

In a preferred embodiment of this invention, a copolymer or oligomer is melt mixed with the treated clay and oxygen scavenging catalyst to form a concentrate that is then melt mixed with a polyamide. This process can be conducted in two separate steps in which the concentrate is isolated as a solid, or in a series of two steps in which the concentrate is used as a melt mixture, or in a single step in which the components are added either simultaneously or sequentially.

In yet another embodiment the oxygen scavenging catalyst is mixed with the layered silicate material and organic cation to bind the organic cation and oxygen scavenging catalyst to said layered silicate material to form an organoclay. The organoclay is incorporated into the matrix polymer to form the polymer-platelet particle composite. This process is particularly advantageous when low extractables are desired, as the catalyst is bound to the platelet particles. Moreover, the counter ions from the cation are washed away during the exchange process, reducing the amount and type of unwanted species in the resultant polymer composite. Further, exchanging the catalyst to the platelet particles also increases the solubility of the selected oxygen scavenging catalyst in the selected polymer. This prevents, or at least minimizes, the formation of undesirable salt crystals which can degrade clarity as well as barrier in the finished article.

If desired the composites may be treated before, during or after the preparation of the composites of this invention for the purposes of increasing the molecular weight or incorporating other fillers, additives, and reagents. Increasing the molecular weight of the polyamide-platelet particle composite may be achieved by several different methods including, but not limited to, reactive chain extension, solid state polymerization, crosslinking, and melt compounding with a high molecular weight, melt processible polyamide. Useful additives and reagents include adhesive modifiers, toners, dyes, coloring agents, UV absorbers, mold release agents, impact modifiers, and their combinations.

In one embodiment of this invention, the oxygen scavenging catalyst is added to the clay either before, during, or after treatments for improving dispersion, such as treatment with organic cations. In a preferred embodiment of this process, the oxygen scavenging catalyst is incorporated onto the clay in a manner that permits it to be bound to the surface of the clay. Many such processes to bind the catalyst to clay, such as by cation exchange, are known by those skilled in the art and may be used in the practice of this invention.

If desired, the oxygen scavenging polyamide platelet particle composite of this invention can be mixed with PET and related copolymers, either virgin or post consumer recycled. In one embodiment of this invention, a composite is formed from a low molecular weight polyamide, silicate material, and an oxygen scavenging catalyst, then the composite is mixed with PET and related copolymers, either virgin or post consumer recycled. Use of a low molecular weight polyamide provides the advantages of improved dispersion of the high concentrations of the silicate material in the polyamide composite, as well as improved mixing with the oxygen scavenging catalyst and PET.

Depending upon the polymers selected the layered silicate material may be added to a different polymer matrix than the oxygen scavenging system. For example, the layered silicate material may be added to a polyamide matrix and the oxygen scavenging system may be incorporated into a polyester. These two materials could then be used to form a multilayer article, preferably with the polyester/oxygen scavenging material disposed in a layer which is closer to the packaging contents than the layer comprising the nanocomposite material.

Molded Articles

This invention also relates to articles prepared from the compositions of this invention, including, but not limited to film, sheet, molded articles, thermoformed articles, stretch blow molded containers, injection blow molded containers, and extrusion blow molded containers. Molded articles typically comprise less than about 8 weight % of polyamide, preferably less than about 4 weight % of polyamide, although portions of the molded container, such as a bottle sidewall, may contain significantly higher local concentrations of the polyamide. Molded articles typically comprise less than about 2.5 weight % silicate material as determined by measuring the amount of ash of the molded article when treated in accordance with ASTM D5630-94, although portions of the molded container, such as a bottle sidewall, may contain significantly higher local concentrations of the silicate material.

In an embodiment of this invention the high barrier polymer-platelet particle composites is used with other polymers layers to form multilayer articles, to such as, but not limited to packaging materials. By using a discrete layer of the composite, the amount of this material that is needed to generate a specific barrier level in the end application is greatly reduced, which improves recyclability and reduces cost. With the polymer-platelet particle composite being sandwiched between two outer polymer layers, the surface roughness is often considerably less than for a monolayer nanocomposite material, thus reducing the level of haze. The layers of the multilayer article may be formed at the same time by co-injection molding or co-extruding or may be formed sequentially. Preferably the layers are formed in the same stage, such as by co-injection or co-extrusion.

In another embodiment of this invention, a mixture of PET and related copolymers, either virgin or post consumer recycled, and the polymer-platelet particle composite are used as a single layer. By using a single layer, conventional equipment for making single layer articles, film, containers, and bottles can be used without detracting significantly from the high barrier properties. If desired, the mixture may be used in conjunction with one or more layers of unmodified PET for the purposes of providing a functional barrier to the composite and/or for improving the surface finish of the product

EXAMPLES

Oxygen consumption was measured on film samples, which were cut into strips, using a Columbus Instruments Micro-Oxymax respirometer with version 6.04b software. Samples were placed into a glass media bottle with a nominal volume of 250 ml. One empty bottle was included as a control blank. The bottles were attached to a ten port expansion module. Readings were taken at the start of the experiment and then every four hours. The instrument measured the change in the oxygen concentration from the previous reading in each cell and calculated the total oxygen consumption and rate based on the (previously measured) volume of the cell plus oxygen sensor system. The oxygen sensor is an electrochemical fuel cell.

Carbon dioxide transmission rates were measured on film samples using a Mocon permeability analyzer.

Comparative Example 1

Two trilayer films were extruded comprising internal layers of about 10 and 30 vol % of unmodified MXD6 6007, available from Mitsubishi Gas Company, with two external layers of PET-9921, available from Eastman Chemical Company. Several 2inch square sections of the trilayer films were stretched using a T.M. Long instrument (4×4 orientation at about 110° C.). The carbon dioxide transmission values of the oriented films were determined to be 174 and 59 cc(STP) $CO_2$/meter$^2$/24 hr for the 10 and 30 vol % films respectively.

Comparative Example 2

Into a 34/45, single-neck, 1-liter, round-bottom flask was charged 250 grams of a low molecular weight, amine terminated poly(m-xylylene adipamide), with IV of about 0.44 dL/g, and 4.23 grams of cobalt acetate tetrahydrate. Under nitrogen atmosphere, the mixture was heated with stirring at 250° C. for 120 minutes then cooled The material was removed from the flask, ground to pass a 3 mm screen, then stored in a nitrogen atmosphere. X-ray analysis of the product showed the concentration of cobalt in the product to be about 4000 ppm.

Using a Leistritz Micro-18 twin screw extruder, 10 parts of the product was extrusion compounded with 90 parts of MXD6 6007, available from Mitsubishi Gas Company, at a temperature of about 250° C. with screw speed of about 260 rpm and feed rate of about 2 kg/hr, to give pelletized material with a cobalt concentration about 400 ppm. The pellets were stored under nitrogen.

Figure 1:
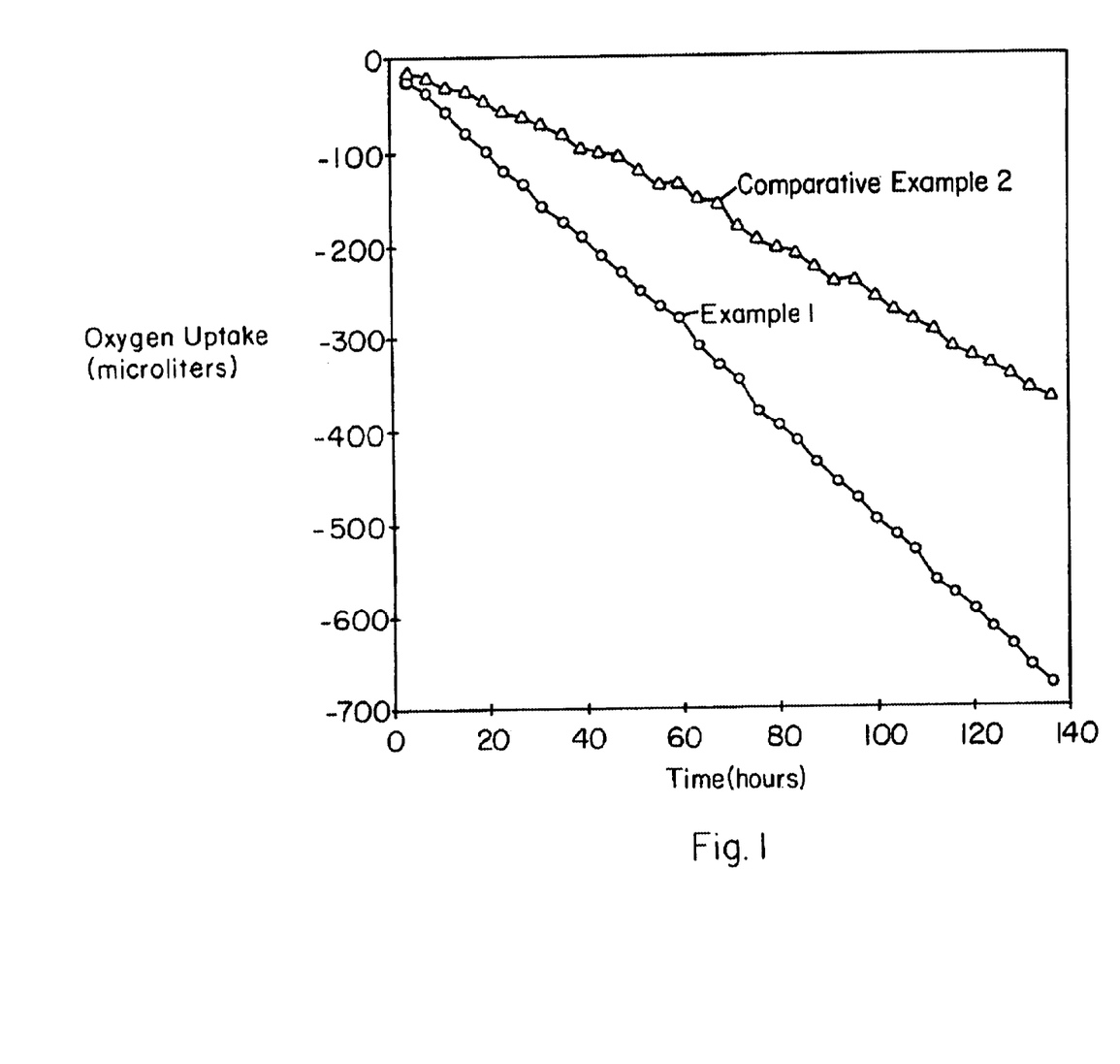

Two trilayer films were extruded comprising internal layers of about 10 and 30 vol % of the above modified MXD6 6007, available from Mitsubishi Gas Company, with two external layers of PET-992, available from Eastman Chemical Company. Several 2-inch square sections of the trilayer films were stretched using a T.M. Long instrument (4×4 orientation at about 110° C.). The carbon dioxide transmission values of the oriented films were determined to be 168 and 54 cc(STP)$CO_2$/meter$^2$/24 hr. for the 10 and 30 vol % films respectively. Oxygen consumption for 3.0 grams of the inner layer, after removing the PET 9921 layers from the unoriented film comprising 30 vol % inner layer, was determined to be about 370 microliters of oxygen over a period of 136 hours, as shown in FIG. 1.

This comparative example shows that the carbon dioxide permeability of the oxygen scavenging MDX6 is essentially equivalent to that of unmodified NMX6.

Example 1

Into a 34/45, single-neck, 1-liter, round-bottom flask were charged 215.75 grams of a low molecular weight, amine terminated poly(m-xylylene adipamide), with IV of about 0.44 dL/g, 34.25 grams of organo montmorillonite clay containing a tether, octadecyl methyl bis(hydroxyethyl) ammonium chloride, an organoclay available from Southern Clay Products, and 4.23 grams of cobalt(II) acetate tetrahydrate. Under nitrogen atmosphere, the mixture was heated with stirring at 250° C. for 120 minutes then cooled. The material was removed from the flask, ground to pass a 3 mm screen, then stored in a nitrogen atmosphere. X-ray analysis of the product showed the concentration of cobalt in the product to be about 3800 ppm.

Using a Leistritz Micro-18 twin screw extruder, 10 parts of the product was extrusion compounded with 90 parts of MXD6 6007, available from Mitsubishi Gas Company, at a temperature of about 260° C. with screw Speed of about 250 rpm and feed rate of about 2 kg/hr, to give pelletized material with a cobalt concentration of about 400 ppm and silicate concentration (ash) of about 1.0 wt %. The pellets were stored under nitrogen.

Two trilayer films were extruded comprising internal layers of about 10 and 30 vol % of the above modified MXD6 6007, available from Mitsubishi Gas Company, with two external layers of PET-9921, available from Eastman Chemical Company. Several 2-inch square sections of the trilayer films were stretched using a T.M. Long Instrument (4×4 orientation at about 110° C.). The carbon dioxide transmission values of the oriented films were determined to be 117 and 41 cc(STP)$CO_2$/meter$^2$/24 hr, for the 10 and 30 vol % films respectively. Oxygen consumption for 3.0 grams of the inner nanocomposite layer, after removing the PET 9921 layers from the unoriented film comprising 30 vol % nanocomposite, was determined to be about 680 microliter of oxygen over a period of 136 hours, as shown in FIG. 1.

This example shows that the nanocomposite composition of this invention has significantly improved carbon dioxide barrier and oxygen consumption.

Comparative Example 3

Figure 2:
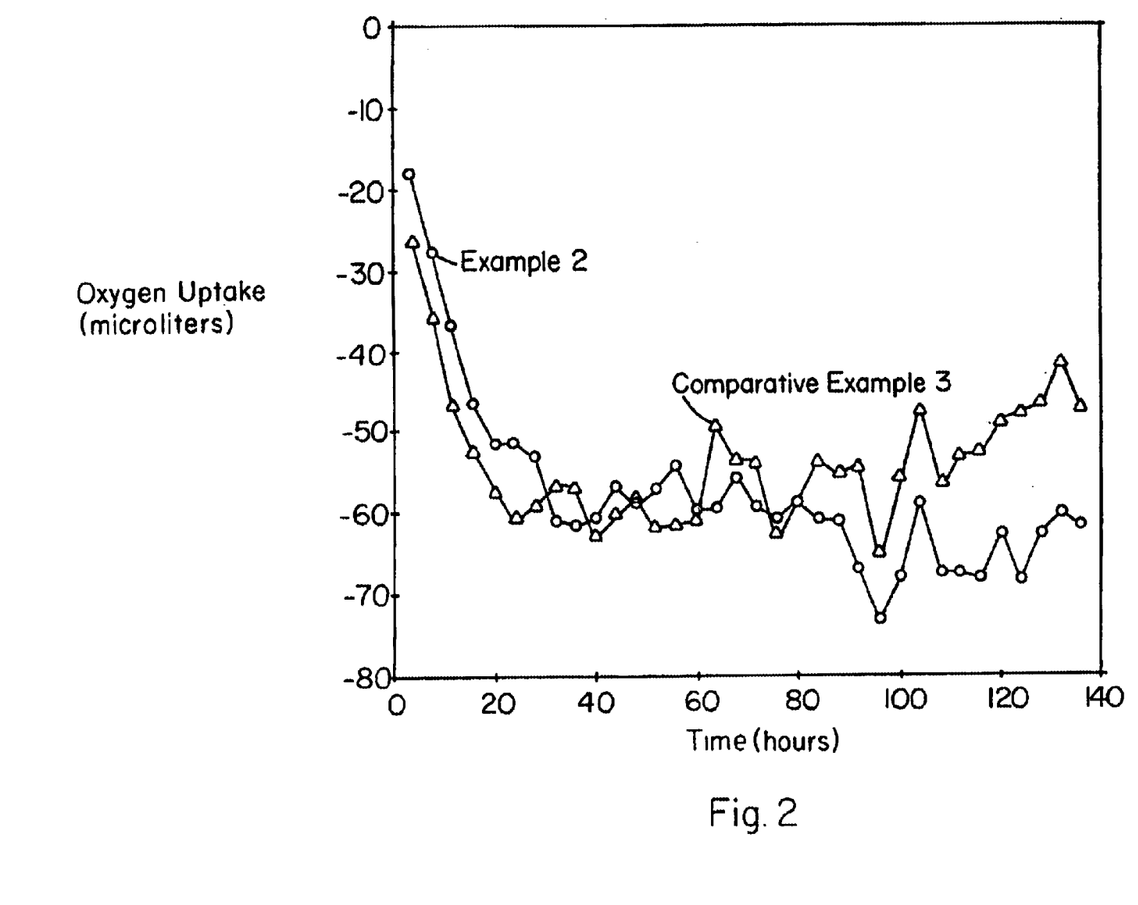

Using a Leistritz Micro-18 twin sow extruder, 4 parts of the material prepared in Comparative Example 2 was extrusion compounded with 96 parts of PET-20281, available from Eastman Chemical Company, at a temperature of about 275° C. with screw speed of about 300 rpm and feed rate of about 2 kg/hr, and the composite was stored under nitrogen. A trilayer film was extruded comprising Internal layers of about 50 vol % of this material with two external layers of PET-9921, available from Eastman Chemical Company. Several 2-inch square sections of the trilayer film was stretched using a T.M. Long Instrument (4×4 orientation at about 110° C.). The carbon dioxide transmission value of the oriented film was determined to be 411 cc(STP)$CO_2$/meter$^2$/24 hr, for the 50 vol % film. Oxygen consumption for 10 grams of the unoriented film comprising 50 vol % of the extrudate of PET9921 with Fe composite was determined to be about 60 microliters of oxygen over a period of 136 hours, as shown in FIG. 2.

Example 2

Using a Leistritz Micro-18 twin screw extruder, 4 parts of the composite prepared in Example 1 was extrusion compounded with 96 parts of amber PET-20261, available from Eastman Chemical Company, at a temperature of about 275° C. with screw speed of about 300 rpm and feed rate of about 2 kg/hr, and the composite was stored under nitrogen.

Two trilayer films were extruded comprising internal layers of about 30 and 50 vol % of this material with two external layers of PET-9921, available from Eastman Chemical Company. Several 2-inch square ions of the trilayer films were shed using a T.M. Long instrument (4×4 orientation at about 110° C.). The carbon dioxide transmission values of the oriented films were determined on a Mocon permeability tester to be 317 and 291 cc(STP)$CO_2$/meter$^2$/24 hr, for the 30 and 50 vol % films respectively. Oxygen consumption for 10 grams of the unoriented film comprising 50 vol % of the extrudate of PET 9921 with the nanocomposite was determined to be about 60 microliters of oxygen over a period of 136 hours, as shown in FIG. 2.

This example shows that the improvements are obtained even when very minor amounts of the composite of this invention are used as a blend in PET.

Example 3

This example illustrates the preparation of montmorillonite clay in which 50% of the sodium cations are exchanged with cobalt and 50% with protons. 40 g (38.0 meq of exchangeable sodium) of refined Wyoming type sodium montmorillonite with cation exchange capacity of 0.95 meq/g available from Southern Clay Products was dispersed in 2000 ml of 70° C. water in a Commercial Waring Blender. Then 2.36 g (19 meq) of cobalt(II) acetate tetrahydrate in 200 ml of water was added followed by additional blending. 50 ml of 0.962 N HCl was then added. The mixture was blended, centrifuged, washed with 1000 ml of water in the blender, then centrifuged again. The product was dried in an oven at 60° C. overnight to provide 14.3 g of final product. Ash content was 87.15 wt %, cobalt content was 1.23%, and X-ray basal spacing was 1.25 nm.

13.2 grams of the treated clay, prepared as described above, was dry mixed with 269 parts of a low molecular weight poly(m-xylylene adipamide), with IV of about 0.41 dL/g. The mixture was dried at 110° C. overnight in a vacuum oven then extruded on the Leistritz Micro 18 extruder equipped with a general compounding screw. The AccuRate pellet feeder was set at a rate of approximately 2 kg/hr with a nitrogen atmosphere over both the feeder and the hopper. The barrel zones were set at 230° C. (zone 2), 240° C. (zones 3–5), 245° C. (zones 6–7) and 250° C. (zone 8 and die) with the screw RPM at approximately 275.

This material showed good oxygen consumption.

Example 4

This example illustrates the preparation of montmorillonite clay in which 50 % of the sodium cations are exchanged with cobalt(II), 25% with octadecyltrimethylammonium cations, and 25% with protons. 10 g (9.5 meq of exchangeable sodium) of refined Wyoming type sodium montmorillonite with cation exchange capacity of 0.95 meq/g available from Southern Clay Products was dispersed in 500 ml of 70° C. water in a Waring blender. Then 0.59 g (4.75 meq) of cobalt(II) acetate tetrahydrate and 1.64 g (2.375 meq) of octadecyltrimethylammonium chloride (commercially available as Arquad 18-50 from Akzo Nobel) in 50 ml of water was added followed by additional blending. 5 ml of 0.962 N HCl was then added. The mixture was blended, centrifuged, washed with 250 ml of water in the blender, then centrifuged again. The product was dried in an oven at 60° C. overnight to provide 6.64 g of final product. Cobalt content was 0.99%, and X-ray basal spacing was 1.34 nm.

13.4 grams of the treated clay, prepared as described above, was dry mixed with 270 parts of a low molecular weight poly(m-xylylene adipamide), with IV of about 0.41 dL/g. The mixture was dried at 110° C. overnight in a vacuum oven then extruded on the Leistritz Micro 18 extruder equipped with a general compounding screw. The AccuRate pellet feeder was set at a rate of approximately 2 kg/hr with a nitrogen atmosphere over both the feeder and the hopper. The barrel zones were set at 230° C. (zone 2), 240° C. (zones 3–5), 245° C. (zones 6–7) and 250° C. (zone 8 and die) with the screw RPM at approximately 275.

This material showed good oxygen consumption.

Example 5

This example illustrates the preparation of montnorillonite clay in which 50% of the sodium cations are exchanged with cobalt(H) and 50% with octadecyl,trimethyl ammonium cations. 10 g (9.5 meq of exchangeable sodium) of refined Wyoming type sodium montmorillonite, with cation exchange capacity of 0.95 meq/g and available from Southern Clay Products, is dispersed in 500 ml of 70° C. water in a Waring Blender. Then 0.59 g (4.75 meq) of cobalt(II) acetate tetrahydrate and 3.28 g (4.75 meq) of octadecyltrimethyl ammonium chloride (commercially available as Arquad 18-50 from Akzo Nobel) in 50 ml of water is added. The mixture is blended, centrifuged, washed with 250 ml of water in the blender, then centrifuged again. The product is dried in an oven at 60° C. overnight.

5 parts of the treated clay, prepared as described above, is dry mixed with 95 parts of a low molecular weight poly(m-xylylene adipamide), with IV of about 0.41 dL/g. The mixture is dried at about 110° C. overnight in a vacuum oven then extruded on the Leistritz Micro 18 extruder equipped with a general compounding screw at a temperature of about 260° C.

This material showed good oxygen consumption.

Example 6

547 parts of a low molecular weight poly(m-xylylene adipamide) with IV about 0.44 dL/g, 129 parts of organo montmorillonite day containing a tether, octadecyl methyl bis(hydroxyethyl) ammonium chloride, an organoclay available from Southern Clay Products, and 39.8 parts of cobalt (II) acetate tetrahydrate were dry mixed then dried at 80° C. overnight In a vacuum oven. The mixture was then extruded on the Leistritz Micro 18 corotating twin screw extruder equipped with a general compounding screw at a temperature of about 240–245° C., with screw speed of about 300 rpm, and a feed rate of about 2 kg/hr. The material was air-cooled on a casting belt then pelletized upon exiting the extruder. After the extrusion was complete, about 40 parts of the pellets were dry-mixed with about 960 parts of CB11, a polyester available from Eastman Chemical Company. The mixture was then extruded on a Killion single screw extruder at a temperature of about 280° C., with s w speed of about 50 rpm. The material was extruded into 5-mil thick film. This film exhibited good carbon dioxide barrier and oxygen consumption.

Example 7

The procedure of Example 6 was repeated except that 547 parts of the low molecular weight nylon, 263 parts of organo montmorillonite clay containing a tether, octadecyl methyl bis(hydroxyethyl) ammonium chloride, an organoclay available from Southern Clay Products, and 40.6 parts of cobalt (II) acetate tetrahydrate in the first extrusion.

Comparative Example 4

The procedure of Example 6 was repeated except that no oxygen scavenging catalyst was used.

Comparative Example 5

The procedure of Example 7 was repeated except that no oxygen scavenging catalyst was used.

We claim:

1. A polymer-platelet particle composite comprising at least one polyamide, at least one oxygen scavenging system, and platelet particles from at least one layered silicate material, wherein said oxygen scavenging system is selected from the group consisting of ethylenically unsaturated hydrocarbons with a transition metal catalyst; ascorbate; isoascorbate; sulfite; ascorbate with an oxygen scavenging catalyst; transition metal complex of a polycarboxylic acid; transition metal complex of polyamine; transition metal complex of salicylic acid; a reduced form of a photoreducible dye compound; carbonyl compound with an absorbance in the ultraviolet spectrum, tannin; polyethers with transition metal catalysts; polyamides with transition metal catalysts; organic compounds having a tertiary hydrogen, benzylic hydrogen, allylic hydrogen in combination with a transition metal catalyst; and an oxidizable metal olefin combination with a salt.

2. The composition of claim 1 wherein said polyamide resin is selected from the group consisting of partially aromatic polyamides.

3. The composition of claim 1 wherein said polyamide resin is selected from the group consisting of poly(m-xylylene adipamide), poly(hexamethylene isophthalamide-co-terephthalamide), poly(m-xylylene adipamide-co-isophthalamide), and mixtures thereof.

4. The composition of claim 1 wherein said polyamide resin comprises poly(m-xylylene adipamide).

5. The composition of claim 1 wherein said platelet particles are present in an amount up to 30 weight percent.

6. The composition of claim 1 wherein said platelet particles are present in an amount up to 20 weight percent.

7. The composition of claim 1 wherein said platelet particles are present in an amount between about 0.01 weight percent and about 20 weight percent.

8. The composition of claim 1 wherein said platelet particles are present in an amount between about 0.5 weight percent and about 20 weight percent.

9. The composition of claim 1 wherein said layered silicate material comprises sodium bentonite, sodium montmorillonite or mixtures thereof.

10. The composition of claim 1 wherein said oxygen scavenging system comprises an oxygen scavenging catalyst which comprises at least one transition metal compound.

11. The composition of claim 10 wherein said oxygen scavenging catalyst is selected from the group consisting of the first, second, and third transition series of the Periodic Table of the Elements.

12. The composition of claim 10 wherein said oxygen scavenging catalyst which comprises at least one cobalt compound.

13. The composition of claim 12 wherein said cobalt compound is selected from the group consisting of cobalt salts of organic acids, cobalt acetates, cobalt halides, and mixtures thereof.

14. The composition of claim 13 wherein said photoreducible dye is selected from the group consisting of quinones and anthraquinones.

15. The composition of claim 1 wherein said layered silicate material is a Wyoming sodium montmorillonite, Wyoming sodium bentonite which has been treated with one or more alkoxylated ammonium cations.

16. The composition of claim 1 further comprising at least one antioxidant.

17. The composition of claim 1 further comprising at least one photoinitiator.

* * * * *